Sept. 14, 1926.
M. HOWE
1,600,043
METHOD AND APPARATUS FOR TESTING HAIR NETS
Filed Nov. 17, 1923
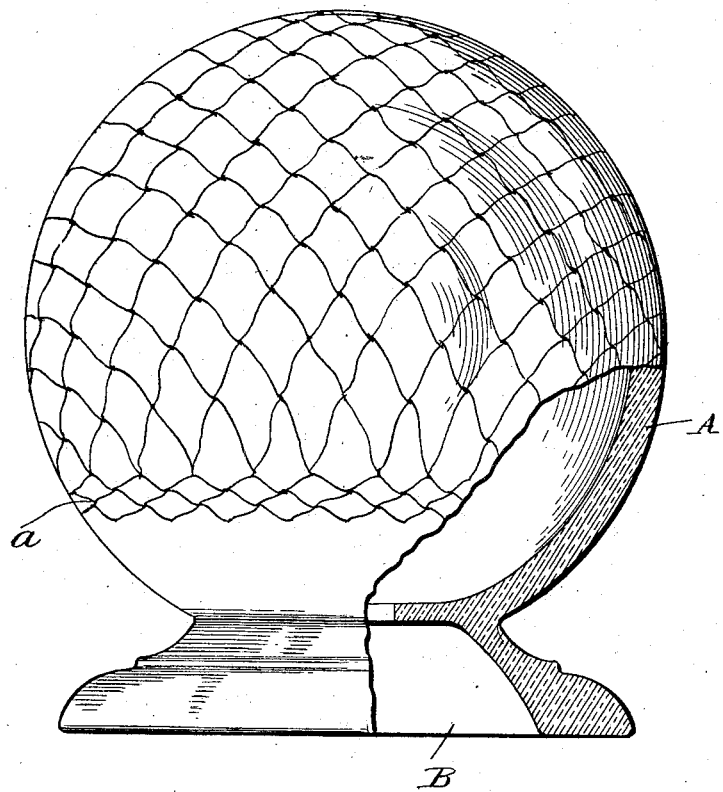
Inventor
May Howe
By Davis & Davis
Attorneys Patented Sept. 14, 1926.

1,600,043

UNITED STATES PATENT OFFICE.

MAX HOWE, OF SEATTLE, WASHINGTON.

METHOD AND APPARATUS FOR TESTING HAIR NETS.

Application filed November 17, 1923. Serial No. 675,368.

Hair-nets, as is well known, are woven of human hair by hand. At present, it is practically exclusively a domestic industry in China. As a result of this, the product greatly varies as to size, color and quality. It is necessary, therefore, to sort these nets before they are marketed. It is the object of this invention to provide a simple method and apparatus whereby a person may readily test nets of the cap type for size, perfection of weave and color, and thus permit ready sorting of the nets prior to packaging them for the market.

In the drawing annexed is represented a side elevation of the apparatus for carrying out my method, part of the wall of the globe being broken away.

I employ a globe A mounted upon and affixed centrally to a broad circular pedestal or base B. I prefer molding these parts integrally of white porcelain, the surface of the globe being white-enameled to give it the necessary smoothness. The globe has a horizontal diameter substantially the same as the selvage rim of the net.

In testing the net, the net is opened and drawn down over the globe. If the selvage edge $a$ of the net passes down over the greatest diameter of the globe, that indicates that the net is of the proper size to pass. If the selvage edge will not pass down over the globe, the net is laid aside to be classified as an undersized net.

If the net falls down over the globe easily, i. e., without appreciable stretching of the selvage edge, it is smoothed down over the globe by the hands of the operator for inspection of weave and color. The globe being white-surfaced, the contrast to the color of the net is decided and thus enables the operator to make quick inspection for color, thereby enabling the operator to readily classify for color.

In inspecting for defects of mesh, the net is slid around on the globe in various directions in order to bring the mesh into view at the front part of the globe. The smooth surface of the globe enables the net to be thus slid around in various directions with great quickness and without injuring the net or the hands of the operator, the palms of the hands being rested lightly on the globe while the shifting operation is being accomplished. By thus providing for ready shifting of the net in its spread condition around the globe, I avoid either compelling the operator to lean over or to walk around the globe or to rotate the globe.

It is important that the globe shall be sufficiently heavy to practically anchor itself on the table or other support, in order that the manipulating of the net by the hands of the operator will not shift the globe about on its support or tip it over. In practice, it has been found that operators readily learn to place the nets on the globe and slide them about thereon with great rapidity, thus enabling classification of the nets to be accomplished at a very low cost.

It will be understood that for testing white or gray nets, the surface of the globe may be dark or black; it will be understood also that the globe may be made of material other than porcelain.

What I claim is:

The method herein described of testing human-hair-nets of the cap type, for size, color and defects consisting in providing a globe of the diameter of the desired net size, the surface of the globe being smooth, and drawing the nets down over said globe and sliding the nets around on the globe in various directions to bring the meshes into convenient position for inspection, the surface of the globe having a color contrasting with the color of the nets.

In testimony whereof I hereunto affix my signature.

MAX HOWE.